(12) United States Patent
Terakawa et al.

(10) Patent No.: US 10,755,841 B2
(45) Date of Patent: *Aug. 25, 2020

(54) MAGNETIC POWDER, METHOD FOR PRODUCTION THEREOF, AND MAGNETIC RECORDING MEDIUM

(71) Applicant: SONY CORPORATION, Tokyo (JP)

(72) Inventors: Masaru Terakawa, Miyagi (JP); Minoru Yamaga, Miyagi (JP)

(73) Assignee: SONY CORPORATION, Tokyo (JP)

( * ) Notice: Subject to any disclaimer, the term of this patent is extended or adjusted under 35 U.S.C. 154(b) by 299 days.

This patent is subject to a terminal disclaimer.

(21) Appl. No.: 15/531,553

(22) PCT Filed: Nov. 13, 2015

(86) PCT No.: PCT/JP2015/005667
§ 371 (c)(1),
(2) Date: May 30, 2017

(87) PCT Pub. No.: WO2016/092744
PCT Pub. Date: Jun. 16, 2016

(65) Prior Publication Data
US 2017/0330661 A1 Nov. 16, 2017

(30) Foreign Application Priority Data

Dec. 12, 2014 (JP) ................................. 2014-252176

(51) Int. Cl.
*G11B 5/66* (2006.01)
*H01F 1/147* (2006.01)
(Continued)

(52) U.S. Cl.
CPC .......... *H01F 1/147* (2013.01); *B05D 3/0254* (2013.01); *B22F 1/0018* (2013.01);
(Continued)

(58) Field of Classification Search
CPC ......... G11B 5/706; G11B 5/708; G11B 5/712; G11B 5/714; G11B 5/842; G11B 5/7028;
(Continued)

(56) References Cited

U.S. PATENT DOCUMENTS

2011/0027588 A1 2/2011 Hattori et al.
2014/0035713 A1 2/2014 Rowe
(Continued)

FOREIGN PATENT DOCUMENTS

JP 2008-243317 A 10/2008
JP 2010-258236 A 11/2010
(Continued)

OTHER PUBLICATIONS

International Search Report and Written Opinion of PCT Application No. PCT/JP20151005667, dated Feb. 2, 2016, 3 pages of English Translation and 8 pages of ISRWO.

*Primary Examiner* — Holly C Rickman
(74) *Attorney, Agent, or Firm* — Chip Law Group

(57) ABSTRACT

A method for producing a magnetic powder includes performing a reduction treatment on the surface of particles including a hard magnetic material to form core-shell particles each having a shell portion including a soft magnetic material.

9 Claims, 2 Drawing Sheets

(51) Int. Cl.
- *B22F 9/22* (2006.01)
- *G11B 5/712* (2006.01)
- *B22F 1/00* (2006.01)
- *G11B 5/706* (2006.01)
- *B22F 1/02* (2006.01)
- *H01F 1/09* (2006.01)
- *G11B 5/708* (2006.01)
- *G11B 5/842* (2006.01)
- *B05D 3/02* (2006.01)
- *G11B 5/714* (2006.01)
- *G11B 5/702* (2006.01)

(52) U.S. Cl.
CPC .............. *B22F 1/0085* (2013.01); *B22F 1/02* (2013.01); *B22F 1/025* (2013.01); *B22F 9/22* (2013.01); *G11B 5/706* (2013.01); *G11B 5/708* (2013.01); *G11B 5/70642* (2013.01); *G11B 5/712* (2013.01); *G11B 5/714* (2013.01); *G11B 5/842* (2013.01); *H01F 1/09* (2013.01); *B22F 2302/25* (2013.01); *C22C 2202/02* (2013.01); *G11B 5/7028* (2013.01)

(58) Field of Classification Search
CPC ......... H01F 1/147; B05D 3/0254; B22F 1/02; B22F 9/22
See application file for complete search history.

(56) References Cited

U.S. PATENT DOCUMENTS

| | | |
|---|---|---|
| 2014/0314658 A1 | 10/2014 | Hattori |
| 2019/0228800 A1* | 7/2019 | Muramatsu .............. B22F 1/00 |

FOREIGN PATENT DOCUMENTS

| | | |
|---|---|---|
| JP | 2011-216838 A | 10/2011 |
| JP | 2012-027978 A | 2/2012 |
| JP | 2012-197474 A | 10/2012 |
| JP | 2014-033187 A | 2/2014 |
| JP | 5416188 B2 | 2/2014 |
| JP | 2014-216034 A | 11/2014 |

* cited by examiner

10,755,841 B2

MAGNETIC POWDER, METHOD FOR PRODUCTION THEREOF, AND MAGNETIC RECORDING MEDIUM

CROSS REFERENCE TO RELATED APPLICATIONS

This application is a U.S. National Phase of International Patent Application No. PCT/JP2015/005667 filed on Nov. 13, 2015, which claims priority benefit of Japanese Patent Application No. JP 2014-252176 filed in the Japan Patent Office on Dec. 12, 2014. Each of the above-referenced applications is hereby incorporated herein by reference in its entirety.

TECHNICAL FIELD

The present technology relates to a magnetic powder including core-shell particles, a method for production thereof, and a magnetic recording medium having a magnetic layer including the magnetic powder.

BACKGROUND ART

Some conventionally known coating-type magnetic recording media have a magnetic layer that is formed by applying, onto a nonmagnetic support, a magnetic coating material including a magnetic powder, a binder, and an organic solvent, and then drying the coating material. Such coating-type magnetic recording media are widely used as high-density recording media such as backup data cartridges.

In recent years, magnetic powders for use in magnetic layers have been made finer for recording media with higher recording density. However, magnetic powders with further reduced particle sizes can be affected by external heat in the environment where magnetic tapes are used, so that the influence of what is called thermal agitation of magnetization can be significant to cause a phenomenon in which the recorded magnetization disappears. To avoid the influence of the thermal agitation of magnetization, it is necessary to increase the magnetic anisotropy or coercivity of magnetic powders.

However, an increase in coercivity can make it difficult for recording heads to cause magnetic reversal, in other words, make it difficult to record information signals. In addition, magnetic powders with further reduced particle sizes may have lower saturation magnetization σs, which, together with a decrease in output due to high-density recording, may cause significant degradation of signal-to-noise ratio or carrier-to-noise ratio (hereinafter referred to as "CNR").

To solve these problems, it is proposed that a soft magnetic coating film with a high saturation magnetization σs be formed around hard magnetic particles so that each hard magnetic particle as a core portion can be exchange-coupled with the soft magnetic coating film as a shell portion, which makes it possible to control the coercivity to a value suitable for recording and to increase the saturation magnetization σs while high thermal stability is maintained (see Patent Documents 1 to 3).

CITATION LIST

Patent Documents

Patent Document 1: Japanese Patent No. 5416188
Patent Document 2: Japanese Patent Application Laid-Open No. 2012-027978
Patent Document 3: Japanese Patent Application Laid-Open No. 2011-216838

SUMMARY OF THE INVENTION

Problems to be Solved by the Invention

It is an object of the present technology to provide a magnetic powder that has high thermal stability and can provide high output levels and the ability to record easily, to provide a method for producing such a magnetic powder, and to provide a magnetic recording medium.

Solutions to Problems

To solve the problems, a first aspect of the present technology is directed to a method for producing a magnetic powder, the method including subjecting hard magnetic particles to a reduction treatment to form core-shell particles each having a shell portion including a soft magnetic material.

A second aspect of the present technology is directed to a magnetic powder including core-shell particles each including a core portion including a hard magnetic material and a shell portion including a soft magnetic material, wherein the soft magnetic material is obtainable by reducing the hard magnetic material.

A third aspect of the present technology is directed to a magnetic recording medium including: a nonmagnetic support; and a magnetic layer including a magnetic powder, wherein the magnetic powder includes core-shell particles each including a core portion including a hard magnetic material and a shell portion including a soft magnetic material, and the soft magnetic material is obtainable by reducing the hard magnetic material.

Effects of the Invention

As described above, the present technology makes it possible to obtain high output levels, high thermal stability, and the ability to record easily.

MODE FOR CARRYING OUT THE INVENTION

Embodiments of the present technology will be described in the following order.
1 First Embodiment
 1.1 Features of magnetic powder
 1.2 Method for producing magnetic powder
 1.3 Advantageous effects
2 Second Embodiment
 2.1 Features of magnetic powder
 2.2 Method for producing magnetic powder
 2.3 Advantageous effects 3 Third Embodiment
3.1 Features of magnetic recording medium
3.2 Method for producing magnetic recording medium
3.3 Advantageous effects 1 First Embodiment

[1.1 Features of Magnetic Powder]

Figure 1:
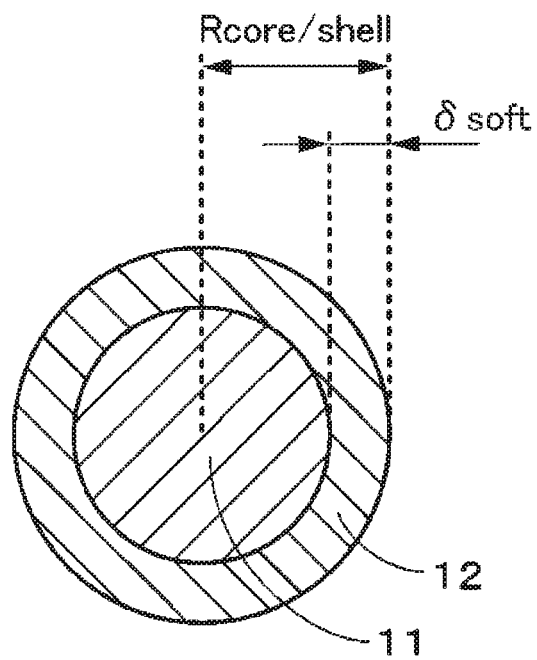
FIG. 1 is a cross-sectional view illustrating an example of the structure of a magnetic powder according to a first embodiment of the present technology.

The magnetic powder according to a first embodiment of the present technology includes a collection of magnetic nanoparticles having a core-shell structure (hereinafter referred to as "core-shell particles"). As illustrated in FIG. 1, the core-shell particles each include a core portion 11 and a shell portion 12 provided around the core portion 11. The core portion 11 is exchange-coupled with the shell portion 12. At the interface between the core and shell portions 11 and 12, there may be a continuous or discontinuous change in their composition and/or state or other properties. The magnetic powder according to the first embodiment is suitable for use in magnetic layers of magnetic recording media.

(Core Portion)

The core portion 11 has hard magnetism. The core portion 11 includes a hard magnetic material, which may be, for example, a cubic iron oxide such as ε iron oxide (ε-$Fe_2O_3$) or Co-containing spinel ferrimagnetic powder. The ε iron oxide preferably includes, as a main phase, an ε-$Fe_2O_3$ crystal (which may include a crystal derived from ε-$Fe_2O_3$ by partially substituting the Fe sites with a metal element M). The metal element M is, for example, one or more selected from the group consisting of Al, Ga, and In. In this regard, when the molar ratio of M to Fe in the iron oxide is expressed as follows: M:Fe=x:(2−x), 0≤x<1 should be satisfied.

In the context of the present technology, unless otherwise specified, the term "ε-$Fe_2O_3$ crystal" is intended to include not only a pure ε-$Fe_2O_3$ crystal where the Fe sites are not substituted with any other element but also a crystal that is derived from ε-$Fe_2O_3$ by partially substituting the Fe sites with a metal element M and has the same space group as that of the pure ε-$Fe_2O_3$ crystal (namely, has a space group of $Pna2_1$).

(Shell Portion)

The shell portion 12 covers at least part of the circumference of the core portion 11. Specifically, the shell portion 12 may partially cover the circumference of the core portion 11 or may cover the entire circumference of the core portion 11. The shell portion 12 preferably covers the entire surface of the core portion 11 so that the exchange coupling between the core and shell portions 11 and 12 can be enough to improve the magnetic properties.

The shell portion 12 is a soft magnetic layer with soft magnetism. The shell portion 12 includes a soft magnetic material, which may be, for example, α-Fe or an Fe-based soft magnetic material. The shell portion 12 can be obtained by reducing the surface of a hard magnetic particle as a precursor of the core-shell particle.

Specifically, the soft magnetic material in the shell portion 12 can be obtained by reducing the hard magnetic material in the core portion 11. For example, when the core portion 11 includes ε iron oxide as a hard magnetic material, the shell portion 12 includes α-Fe, which is a material obtainable by reduction of ε iron oxide. When the core portion 11 includes a Co-containing spinel ferrimagnetic material as a hard magnetic material, the shell portion 12 includes an Fe-based soft magnetic material, which is obtainable by reduction of the Co-containing spinel ferrimagnetic material.

(Average Particle Size of Core-Shell Particles)

The core-shell particles (magnetic powder) preferably have an average particle size (radius) $R_{core/shell}$ satisfying 4.9 nm≤$R_{core/shell}$≤15 nm. If $R_{core/shell}$ is less than 4.9 nm ($R_{core/shell}$<4.9 nm), it may be difficult to suppress aggregation of the core-shell particles. On the other hand, if $R_{core/shell}$ is more than 15 nm (15 nm<$R_{core/shell}$), magnetic recording media produced with the magnetic powder may have high noise. In this case, coating films produced with the magnetic powder may also have degraded surface quality. In this regard, the average particle size $R_{core/shell}$ of the core-shell particles is substantially equal to the average particle size $R_{ini}$ of the hard magnetic particles as precursors of the core-shell particles. Therefore, the hard magnetic particles as precursors also preferably have an average particle size $R_{ini}$ satisfying 4.9 nm≤$R_{core/shell}$≤15 nm.

The average particle size $R_{core/shell}$ of the core-shell particles (magnetic powder) can be determined as described below. First, the magnetic powder is photographed with a transmission electron microscope (TEM). Subsequently, 500 core-shell particles are randomly selected in the resulting TEM photograph and each measured for particle size. In this case, the particle size (radius) means the value of half of the maximum distance across the core-shell particle (namely, the maximum particle diameter). Subsequently, the average particle size $R_{core/shell}$ of the core-shell particles is calculated as the simple average (arithmetic average) of the measured particle sizes of the 500 core-shell particles.

(Ratio of Half Width of Particle Size Distribution to Average Particle Size)

The percentage ratio D of the half width $D_{half}$ of the particle size distribution of the core-shell particles (magnetic powder) to the average particle size $D_{ave}$ of the core-shell particles (magnetic powder) is preferably 40% or less. Specifically, the ratio D is defined by the following formula.

Ratio D (%)=(the half width $D_{half}$ (nm) of the particle size distribution of the core-shell particles/ the average particle size $D_{ave}$ (nm) of the core-shell particles)×100

If the particle size distribution is broad with a ratio D of more than 40%, the thickness of the shell portion 12 may fail to be controlled uniformly between the core-shell particles, so that variations in magnetic properties such as coercivity Hc can occur between the core-shell particles. Note that in this embodiment, the particle size distribution of the core-shell particles is substantially equal to that of the hard magnetic particles as precursors of the core-shell particles.

The ratio D of the core-shell particles (magnetic powder) can be determined as described below. First, the magnetic powder is photographed with a TEM. Subsequently, 500 core-shell particles are randomly selected in the resulting TEM photograph and each measured for particle size (diameter). The particle size distribution of the magnetic powder is determined from the measured particle sizes. In this case, the particle size means the maximum distance across the particle (namely, the maximum particle diameter). Subsequently, the median diameter (50% diameter or D50) is determined from the determined particle size distribution and used as the average particle size $D_{ave}$. The half width $D_{half}$ of the particle size distribution is also determined from the determined particle size distribution. Subsequently, the ratio D is calculated from the determined average particle size $D_{ave}$ and the half width $D_{half}$ of the particle size distribution.

(Coercivity)

The core-shell particles (magnetic powder) preferably have a coercivity Hc of 2,000 Oe to 6,000 Oe (2,000 Oe≤Hc≤6,000 Oe). If the Hc is less than 2,000 Oe (Hc<2,000 Oe), magnetic recording media produced with the magnetic powder may have lower output levels during short-wavelength recording (high-density recording). On the other hand, an Hc of more than 6,000 Oe (6,000 Oe<Hc) may make it difficult for recording heads to perform saturated recording and make it impossible to obtain good CNR.

The coercivity Hc of the core-shell particles (magnetic powder) can be determined as described below. First, the M-H loop of the magnetic powder is obtained using a vibrating sample magnetometer (VSM). Subsequently, the coercivity Hc is determined from the resulting M-H loop.

(Saturation Magnetization)

The core-shell particles (magnetic powder) preferably have a saturation magnetization σs of 10 emu/g to 100 emu/g (10 emu/g≤σs≤100 emu/g). If the σs is less than 10 emu/g (σs<10 emu/g), magnetic recording media produced with the magnetic powder may have lower output levels and fail to achieve good CNR even when the packing density or squareness ratio of the magnetic powder is improved. On the other hand, if the σs is more than 100 emu/g (100 emu/g<σs), magnetic recording media produced with the magnetic powder may cause reproducing head saturation and generate noise.

The saturation magnetization σs of the core-shell particles (magnetic powder) can be determined as described below. First, the M-H loop of the magnetic powder is obtained using a VSM. Subsequently, the saturation magnetization σs is determined from the resulting M-H loop.

(Average Thickness of Shell Portion)

The average thickness $\delta_{soft}$ of the shell portion 12 preferably satisfies 0.4 nm≤$\delta_{soft}$≤11 nm. If the $\delta_{soft}$ is less than 0.4 nm ($\delta_{soft}$<0.4 nm), it may be difficult to perform a uniform reduction treatment on the hard magnetic particles in the magnetic powder producing method described below, so that the core portion 11 may be insufficiently exchange-coupled with the shell portion 12. On the other hand, if the $\delta_{soft}$ is more than 11 nm (11 nm<$\delta_{soft}$), the core-shell particles may have reduced coercivity Hc, so that good electromagnetic conversion characteristics may fail to be obtained.

The average thickness $\delta_{soft}$ of the shell portion 12 can be determined as described below. First, the magnetic powder is photographed with a TEM. Subsequently, 500 core-shell particles are randomly selected in the resulting TEM photograph and each measured for the thickness of the shell portion 12. Note that when there are variations in the thickness of the shell portion 12 in a single core-shell particle, the thickness of the shell portion 12 is defined as the maximum thickness of the shell portion 12 of the single core-shell particle. Subsequently, the average thickness $\delta_{soft}$ of the shell portion 12 is calculated as the simple average (arithmetic average) of the measured thicknesses of the shell portions 12 of the 500 core-shell particles.

[1.2 Method for Producing Magnetic Powder]

The method according to the first embodiment of the present technology for producing a magnetic powder includes performing a reduction treatment directly on hard magnetic particles as precursors of core-shell particles, so that core-shell particles are produced, each including a core portion 11 with hard magnetism and a shell portion with soft magnetism. Hereinafter, a description will be given of an example of the method according to the first embodiment of the present technology for producing a magnetic powder.

(Step of Producing Powder of Hard Magnetic Particles)

First, a powder is produced including a collection of hard magnetic particles with high coercivity and high crystal magnetic anisotropy. The hard magnetic particles include a hard magnetic material similar to that in the core portion 11 described above. When particles including ε iron oxide are to be used as the hard magnetic particles, for example, the method described in Japanese Patent No. 5105503 may be used to produce the particles. The method described in the patent document can make the particle size distribution sharper than that obtained by general production methods using reverse micelle method.

(Coating Step)

Subsequently, a coating layer is optionally formed on the surface of the hard magnetic particles in order to suppress aggregation of the hard magnetic particles. Alternatively, a coating layer may be formed in advance on the surface of the hard magnetic particles in the above step of producing a powder of hard magnetic particles. The coating layer includes, for example, silica, alumina, calcia, magnesia, or zirconia.

Hereinafter, a specific example of silica coating will be described. First, a mixture solution is prepared by adding polyoxyethylene nonylphenyl ether and an ammonia solution to cyclohexane and mixing them. Subsequently, the powder of hard magnetic particles obtained in the previous step is dispersed in cyclohexane, and then the dispersion is added to the prepared mixture solution. Subsequently, tetraethoxysilane is further added to the mixture solution and then stirred. The resulting powder is washed with methanol and ethanol. In this way, a powder of silica layer-coated hard magnetic particles is obtained.

(Reduction Treatment Step)

Subsequently, the surface of the hard magnetic particles is subjected to a reduction treatment, so that core-shell particles are formed, each including a core portion 11 including the hard magnetic material; and a shell portion 12 including a soft magnetic material. In this regard, when the coating layer is formed on the surface of the hard magnetic particles, the reduction treatment is performed on the surface of the hard magnetic particles through the coating layer.

For example, when the hard magnetic particles include ε iron oxide, the surface of the particles including ε iron oxide is reduced, so that core-shell particles are formed, each including a core portion 11 including ε iron oxide; and a shell portion 12 including α-Fe.

The reduction treatment method may be any of a gas phase reduction method and a liquid phase reduction method. The gas phase reduction method may be, for example, a method of subjecting the surface of the hard magnetic particles to a reduction treatment in a hydrogen atmosphere. The liquid phase reduction method may include, for example, immersing the hard magnetic particles in a solvent, then adding a reducing agent to the solvent, and stirring them so that the surface of the hard magnetic particles is subjected to a reduction treatment in the solvent.

(Removal Step)

When the coating step is performed to form the coating layer on the surface of the hard magnetic particles, the coating layer should be finally removed from the surface of the core-shell particles, for example, by an acid treatment using an acid solution. The magnetic powder including a collection of core-shell particles is obtained as described above.

[1.3 Advantageous Effects]

The magnetic powder according to the first embodiment includes a collection of core-shell particles each including a core portion 11 including a hard magnetic material; and a shell portion 12 including a soft magnetic material. When magnetic recording media are produced with the magnetic powder, the resulting media having a magnetic layer including the magnetic powder can have high output levels and high thermal stability and provide the ability to record easily.

The method according the first embodiment for producing a magnetic powder includes subjecting hard magnetic particles to a reduction treatment, so that core-shell particles are formed, each having a shell portion 12 including a soft magnetic material. This makes it possible to produce uniform core-shell particles and to uniformly produce exchange interaction between the hard magnetic particle as the core portion 11 and the soft magnetic material as the shell portion 12. Therefore, the properties of the soft magnetic material with a high saturation magnetization σs can be utilized, so that the resulting core-shell particle as a whole can have a high saturation magnetization σs. The ability to record easily is also enhanced because the coercivity Hc of the core portion 11 itself can be kept at a high level for reliable thermal stability while the coercivity Hc of the core-shell particle as a whole can be controlled to a level suitable for recording. In addition, the hard magnetic particle as the core portion 11 can be made larger than that obtainable by conventional methods, which makes it easy to maintain high coercivity Hc and is advantageous for improving thermal stability.

A general method for producing a magnetic powder includes depositing, by a liquid phase method, a precursor of a soft magnetic material on the surface of hard magnetic particles for core portions and then subjecting the precursor to a reduction treatment to form a soft magnetic material as a shell portion on the surface of the hard magnetic particles. When using this general method for producing core-shell particles, there will be a high probability that the core portion will fail to be covered with the shell portion so that the exchange coupling between the core and shell portions will be insufficient. There is also a fear that when the reduction treatment is performed, the surface of the core portion may be partially exposed without being completely covered with the shell portion, so that only the exposed part of the core portion may be reduced, which may lead to degradation of magnetic properties such as saturation magnetization σs and coercivity Hc.

In contrast, the possibility of insufficient exchange coupling between the core and shell portions is low in the method according to the first embodiment for producing a magnetic powder because the method according to the first embodiment includes subjecting the surface of hard magnetic particles to a reduction treatment to form core-shell particles each having a core portion covered with a shell portion. Also in contrast to the general method for producing a magnetic powder, the method according to the first embodiment is prevented from reducing only an exposed part of the core portion. This means that there is no fear of degradation of magnetic properties such as saturation magnetization σs and coercivity Hc.

When using the above general method for producing a magnetic powder (core-shell particles), there will be a high probability that the hard magnetic particles for forming core portions will aggregate during the deposition of the precursor by the liquid phase method. In this case, the exchange coupling effect may be insufficient, and the magnetic volume may increase so that noise may increase.

In contrast, when including the coating step, the method according to the first embodiment for producing a magnetic powder (core-shell particles) can suppress aggregation of the hard magnetic particles as precursors. This will reduce the probability of insufficient exchange coupling, the probability of an increase in magnetic volume, and the probability of an increase in noise.

When using the above general method for producing a magnetic powder, the size $R_{core/shell}$ of the resulting core-shell particles will be necessarily larger than the size $R_{ini}$ of the hard magnetic particles prepared for core portions ($R_{ini}<R_{core/shell}$) because the precursor of the soft magnetic material is deposited later on the surface of the hard magnetic particles prepared for core portions. Therefore, to secure good C/N, it is desired to further reduce the size of the hard magnetic particles for forming core portions. However, the particle size reduction may degrade the magnetic properties such as coercivity Hc and saturation magnetization σs, which are basically required of hard magnetic particles for use in high-density recording media. In addition, the particle size distribution may vary, or the particles may aggregate significantly.

In contrast, when using the method according to the first embodiment for producing a magnetic powder, the size of the core-shell particles obtained after the reduction treatment will be substantially equal to the size of the hard magnetic particles used as the precursors ($R_{ini}=R_{core/shell}$) because the surface of the hard magnetic particles prepared previously are directly subjected to the reduction treatment in the method according to the first embodiment. Therefore, when the size of the hard magnetic particles as the precursors is controlled, core-shell particles with the desired size can be successfully produced. Therefore, the method according to the first embodiment is less likely to cause degradation of magnetic properties, which can be a concern in the above general method for producing a magnetic powder. In addition, the method according to the first embodiment is less likely to cause variations in particle size distribution or aggregation of particles.

2 Second Embodiment

[2.1 Features of Magnetic Powder]

Figure 2:
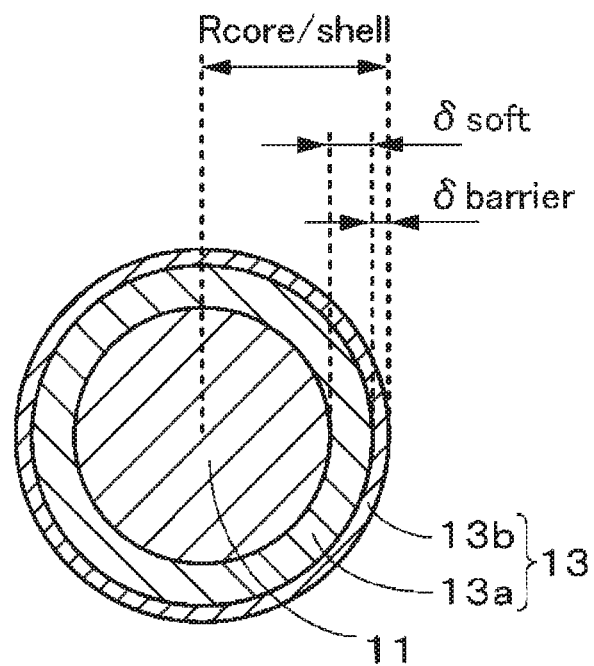
FIG. 2 is a cross-sectional view illustrating an example of the structure of a magnetic powder according to a second embodiment of the present technology.

As illustrated in FIG. 2, the magnetic powder according to a second embodiment of the present technology includes a collection of core-shell particles each including a core portion 11 and a shell portion 13 provided around the core portion 11 and having a two-layer structure. Components similar to those in the first embodiment are denoted by the same reference signs, and a repeated description thereof will be omitted.

(Shell Portion)

The shell portion 13 with a two-layer structure includes a soft magnetic layer 13a provided on the core portion 11 and an oxide film 13b provided on the soft magnetic layer 13a.

(Soft Magnetic Layer)

The soft magnetic layer 13a is similar to the shell portion 12 in the first embodiment.

(Oxide Film)

The oxide film 13b, which is an anti-oxidation layer, includes a material that can be obtained by oxidizing the soft magnetic material in the soft magnetic layer 13a. Specifically, the oxide film 13b can be obtained by oxidizing the surface of the soft magnetic layer as a precursor. When the soft magnetic layer 13a includes α-Fe as a soft magnetic material, the oxide film 13b includes at least one of $Fe_3O_4$, $Fe_2O_3$, and FeO, which can be obtained by oxidizing α-Fe.

(Average Thickness of Oxide Film)

The oxide film 13b preferably has an average thickness $\delta_{barrier}$ satisfying 0.4 nm≤$\delta_{barrier}$≤11 nm. If the $\delta_{barrier}$ is less than 0.4 nm ($\delta_{barrier}$<0.4 nm), it may be difficult to control the thickness of the oxide film 13b and also difficult to allow the oxide film 13b to function effectively. On the other hand, if the $\delta_{barrier}$ is more than 11 nm (11 nm<$\delta_{barrier}$), the shell portion 12 may be relatively thin so that the exchange coupling between the core and shell portions 11 and 12 may be insufficient.

The average thickness $\delta_{barrier}$ of the oxide film 13b can be determined as described below. First, the magnetic powder is photographed with a TEM. Subsequently, 500 core-shell particles are randomly selected in the resulting TEM photograph and each measured for the thickness of the oxide film 13b of each core-shell particle. Note that when there are variations in the thickness of the oxide film 13b of a single core-shell particle, the thickness of the oxide film 13b is defined as the maximum thickness of the oxide film 13b of the single core-shell particle. Subsequently, the average thickness $\delta_{barrier}$ of the oxide film 13b is calculated as the simple average (arithmetic average) of the measured thicknesses of the oxide films 13b of the 500 core-shell particles.

(Ratio of the Average Thickness of Soft Magnetic Layer to the Average Thickness of Oxide Film)

The ratio ($\delta_{soft}/\delta_{barrier}$) of the average thickness $\delta_{soft}$ of the soft magnetic layer 13a to the average thickness $\delta_{barrier}$ of the oxide film 13b preferably satisfies $0.1 \leq \delta_{soft}/\delta_{barrier} \leq 10$. If $\delta_{soft}/\delta_{barrier}$ is either less than 0.1 or more than 10 ($\delta_{soft}/\delta_{barrier}$<0.1 and 10<$\delta_{soft}/\delta_{barrier}$), it may be difficult to uniformly maintain the thickness of the soft magnetic layer 13a and the oxide film 13b on the nanometer order, which may make it impossible to obtain the desired core-shell particles.

The ratio ($\delta_{soft}/\delta_{barrier}$) can be determined as described below. First, the average thickness $\delta_{barrier}$ of the oxide film 13b is determined as described above. Subsequently, the average thickness $\delta_{soft}$ of the soft magnetic layer 13a is determined similarly to the average thickness $\delta_{barrier}$ of the oxide film 13b, except that the thickness of the soft magnetic layer 13a is measured instead of that of the oxide film 13b. Subsequently, the ratio ($\delta_{soft}/\delta_{barrier}$) is calculated from the determined average thicknesses $\delta_{soft}$ and $\delta_{barrier}$.

[2.2 Method for Producing Magnetic Powder]

The method according to the second embodiment of the present technology for producing a magnetic powder differs from the method according to the first embodiment for producing a magnetic powder in that it further includes a gradual oxidation step after the reduction treatment step and before the removal step. Therefore, hereinafter, only the gradual oxidation step will be described.

(Gradual Oxidation Step)

The reduction treatment step described above is followed by subjecting the core-shell particles to a gradual oxidation treatment under an atmosphere containing a small amount of oxygen for a predetermined time (e.g., 10 minutes) in a high-temperature environment without exposing the core-shell particles to the air. As a result, the oxide film 13b is formed on the surface of the core-shell particles. Specifically, the shell portion 13 is formed having the soft magnetic layer 13a and the oxide film 13b.

[2.3 Advantageous Effects]

In the magnetic powder according to the second embodiment, the core-shell particles have the oxide film 13b at their surface and thus resist rusting of their surface and other damage, which would otherwise occur when the surface of the core-shell particles is exposed to the air. Therefore, the magnetic powder has properties resistant to degradation.

3 Third Embodiment

A third embodiment shows a magnetic recording medium having a magnetic layer including the magnetic powder according to the first or second embodiment.

[3.1 Features of Magnetic Recording Medium]

Figure 3:
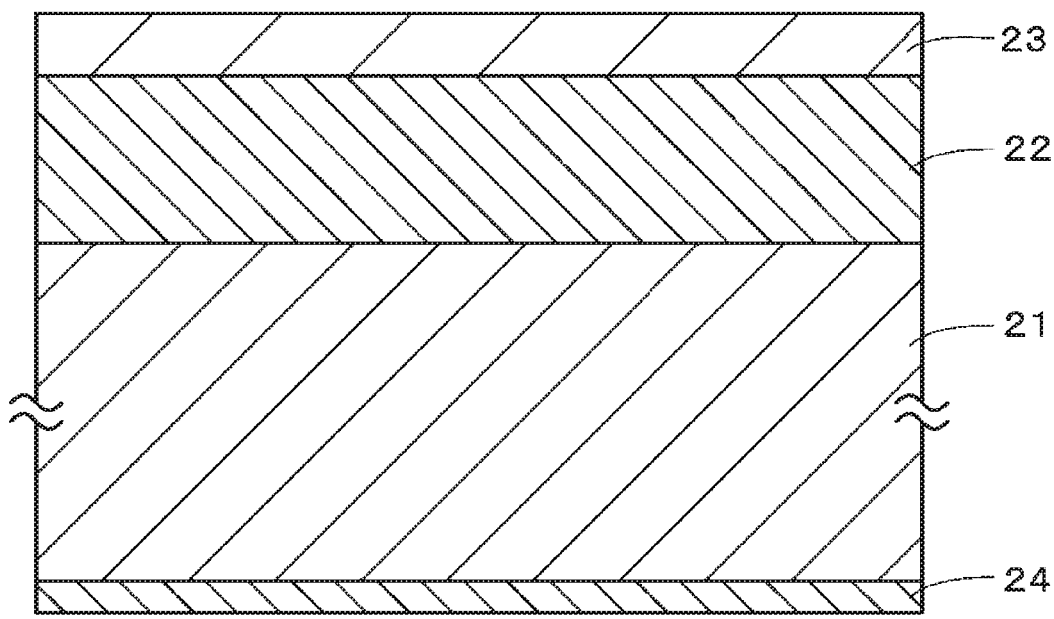
FIG. 3 is a cross-sectional view illustrating an example of the structure of a magnetic recording medium according to a third embodiment of the present technology.

As illustrated in FIG. 3, the magnetic recording medium according to a third embodiment of the present technology includes a nonmagnetic support 21, a nonmagnetic layer 22 provided on one principal surface of the nonmagnetic support 21, and a magnetic layer 23 provided on the nonmagnetic layer 22. If necessary, the magnetic recording medium may further include a back coat layer 24 provided on the other principal surface of the nonmagnetic support 21. The magnetic recording medium according to the third embodiment is, for example, a vertical magnetic recording medium for use with a giant magneto-resistance (GMR) head as a reproducing head for a recording/reproducing system.

(Nonmagnetic Support)

The nonmagnetic support 21 is, for example, a long flexible film. Examples of materials that can be used to form the nonmagnetic support 21 include polyesters such as polyethylene terephthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, polycarbonate, polyimide, polyamide-imide, and other plastics, light metals such as aluminum alloys and titanium alloys, and ceramics such as alumina glass. To increase the mechanical strength, a thin film including an oxide of Al or Cu may be formed at least one of the principal surfaces of the nonmagnetic support 21 including, for example, a vinyl resin, and such a thin film-coated support may also be used.

(Magnetic Layer)

The magnetic layer 23 includes, for example, a magnetic powder, a binder, and conductive particles. If necessary, the magnetic layer 23 may further include an additive such as a lubricant, an abrasive, or an antirust agent.

(Magnetic Powder)

The magnetic powder is according to the first or second embodiment described above. The average particle size $R_{core/shell}$ of the core-shell particles, the ratio D (=($D_{half}/D_{ave}$)×100), the average thickness $\delta_{sof}$ of the shell portion 12, the average thickness $\delta_{barrier}$ of the oxide film 13b, the value range of the ratio ($\delta_{soft}/\delta_{barrier}$), and other features are preferably similar to those in the first and second embodiments. These values can be determined as described below. First, a cross-section is cut from the magnetic recording medium. The magnetic powder in the cross-section is photographed with a TEM. The values can be determined as described for the first and second embodiments, except that the resulting TEM photograph is used.

(Binder)

The binder is preferably a resin having a structure formed by subjecting a polyurethane resin, a vinyl chloride resin, or other resins to a crosslinking reaction. However, the binder is not limited to such a resin, and any other resin may be added as appropriate depending on the physical properties required of the magnetic recording medium. Any resin commonly used for coating type magnetic recording media may be added.

Examples include vinyl chloride, vinyl acetate, vinyl chloride-vinyl acetate copolymers, vinyl chloride-vinylidene chloride copolymers, vinyl chloride-acrylonitrile copolymers, acrylic ester-acrylonitrile copolymers, acrylic ester-vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-vinyl chloride copolymers, methacrylic ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, amino resins, and synthetic rubber.

Thermosetting resins or reactive resins may also be used, examples of which include phenolic resins, epoxy resins, urea resins, melamine resins, alkyd resins, silicone resins, polyamine resins, and urea-formaldehyde resins.

To improve the dispersibility of the magnetic powder, a polar functional group such as $-SO_3M$, $-OSO_3M$, $-COOM$, or $P=O(OM)_2$ may also be introduced into each of the above binders. In the formulae, M is a hydrogen atom or an alkali metal such as lithium, potassium, or sodium.

The polar functional group may also be of a side chain type having an $-NR1R2$ or $-NR1R2R3+X-$ terminal group or of a main chain type of $>NR1R2+X-$. In the formulae, R1, R2, and R3 are each a hydrogen atom or a hydrocarbon group, and $X-$ is a halogen ion such as a fluorine, chlorine, bromine, or iodine ion or an inorganic or organic ion. The polar functional group may also be $-OH$, $-SH$, $-CN$, or an epoxy group.

(Conductive Particles)

The conductive particles may be fine particles including carbon as a main component, such as carbon black. The carbon black may be, for example, Asahi #15 or #15HS from Asahi Carbon Co., Ltd. Hybrid carbon particles composed of silica particles and carbon deposited on the surface thereof may also be used.

(Nonmagnetic Reinforcing Particles)

The magnetic layer 23 may further contain nonmagnetic reinforcing particles such as particles of aluminum oxide (α, β, γ), chromium oxide, silicon oxide, diamond, garnet, emery, boron nitride, titanium carbide, silicon carbide, titanium carbide, or titanium oxide (rutile, anatase).

(Nonmagnetic Layer)

The nonmagnetic layer 22 includes a nonmagnetic powder and a binder as main components. If necessary, the nonmagnetic layer 22 may further include various additives such as conductive particles and a lubricant.

(Nonmagnetic Powder)

The nonmagnetic powder may include appropriate fine particles of any of various shapes such as needle, spherical, and plate shapes.

(Binder)

The binder may be any of those suitable for use in the magnetic layer 23 described above. A combination of a resin and a polyisocyanate may also be used to form the nonmagnetic layer 22, in which the resin may be crosslinked and cured with the polyisocyanate. Examples of the polyisocyanate include toluene diisocyanate and adducts thereof, and alkylene diisocyanate and adducts thereof.

(Conductive Particles)

Like the conductive particles for the magnetic layer 23 described above, the conductive particles for the nonmagnetic layer 22 may include, for example, carbon black or hybrid carbon particles composed of silica particles and carbon deposited on the surface thereof.

(Lubricant)

The magnetic layer 23 and the nonmagnetic layer 22 may contain any appropriate lubricant, examples of which include esters of a monobasic fatty acid of 10 to 24 carbon atoms with any of monohydric to hexahydric alcohols of 2 to 12 carbon atoms, any mixture of these esters, or di- or tri-fatty acid esters. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

[3.2 Method for Producing Magnetic Recording Medium]

Hereinafter, a description will be given of an example of a method for producing the magnetic recording medium having the features described above.

First, a nonmagnetic layer-forming coating material is prepared by kneading and dispersing the nonmagnetic powder, the conductive particles, the binder, and other materials in a solvent. Subsequently, a magnetic layer-forming coating material is prepared by kneading and dispersing the magnetic powder, the conductive particles, the binder, and other materials in a solvent. Similar solvents, dispersing machines, and kneading machines may be used in the preparation of the magnetic layer-forming coating material and the nonmagnetic layer-forming coating material.

Examples of solvents that can be used for the preparation of the coating materials include ketone solvents such as acetone, methyl ethyl ketone, methyl isobutyl ketone, and cyclohexanone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethylene glycol dimethyl ether, 2-ethoxyethanol, tetrahydrofuran, and dioxane; aromatic hydrocarbon solvents such as benzene, toluene, and xylene; and halogenated hydrocarbon solvents such as methylene chloride, ethylene chloride, carbon tetrachloride, chloroform, and chlorobenzene. These solvents may be used alone or in any mixture.

The coating materials may be prepared using a kneading machine, examples of which include, but are not limited to, biaxial continuous kneaders, biaxial continuous kneaders capable of multistage dilution, kneaders, pressure kneaders, and roll kneaders. The coating materials may also be prepared using a dispersing machine, examples of which include, but are not limited to, roll mills, ball mills, horizontal sand mills, vertical sand mills, spike mills, pin mills, tower mills, DCP mills, homogenizers, and ultrasonic dispersers.

Subsequently, the nonmagnetic layer-forming coating material is applied to one principal surface of the nonmagnetic support 21 and then dried to form the nonmagnetic layer 22. Subsequently, the magnetic layer-forming coating material is applied onto the nonmagnetic layer 22 and then dried to form the magnetic layer 23 on the nonmagnetic layer 22. Subsequently, a back coat layer-forming coating material is applied to the other principal surface of the nonmagnetic support 21 and then dried to form the back coat layer 24.

Subsequently, the nonmagnetic support 21 with the nonmagnetic layer 22, the magnetic layer 23, and the back coat layer 24 formed thereon is re-wound on a large diameter core and then subjected to a curing treatment. Subsequently, the nonmagnetic support 21 with the nonmagnetic layer 22, the magnetic layer 23, and the back coat layer 24 formed thereon is calendered and then cut into pieces with a predetermined width. In this way, pancakes are obtained, which correspond to the cut pieces with the predetermined width. Note that the step of forming the back coat layer 24 may be performed after the calendering.

The steps of forming the nonmagnetic layer 22 and the magnetic layer 23 are not limited to the examples described above. For example, the nonmagnetic layer 22 and the magnetic layer 23 may be formed on one principal surface of the nonmagnetic support 21 by a process that includes applying the nonmagnetic layer-forming coating material to one principal surface of the nonmagnetic support 21 to form a wet coating film, applying the magnetic layer-forming coating material onto the wet coating film to form a coating film, and then drying both coating films.

[3.3 Advantageous Effects]

In the magnetic recording medium according to the third embodiment, the magnetic layer 23 includes a collection of the core-shell particles each including the core portion including a hard magnetic material and the shell portion including a soft magnetic material. This allows the magnetic recording medium to have high output levels, high thermal stability, and a good ability to record easily.

The present technology has been described specifically with reference to embodiments. It will be understood that the above embodiments are not intended to limit the present technology and that various modifications thereof may be made on the basis of the technical idea of the present technology.

For example, the structures, methods, steps, shapes, materials, numerical values, and other features described in connection with the above embodiments are by way of example only, and may be changed or modified as needed.

In addition, any combination of the structures, methods, steps, shapes, materials, numerical values, and other features described in connection with the above embodiments is possible without departing from the gist of the present technology.

The present technology may also have the following features.

(1)

A method for producing a magnetic powder, the method including subjecting hard magnetic particles to a reduction treatment to form core-shell particles each having a shell portion including a soft magnetic material.

(2)

The method according to item (1) for producing a magnetic powder, wherein the hard magnetic particles include an $\varepsilon$-$Fe_2O_3$ crystal (which may include a crystal derived from $\varepsilon$-$Fe_2O_3$ by partially substituting the Fe sites with a metal element M).

(3)

The method according to item (1) or (2) for producing a magnetic powder, wherein the soft magnetic material is $\alpha$-Fe.

(4)

The method according to any one of items (1) to (3) for producing a magnetic powder, the method further including forming a coating layer on the hard magnetic particles before the reduction treatment and removing the coating layer from the core-shell particles after the reduction treatment.

(5)

The method according to item (4) for producing a magnetic powder, wherein the coating layer includes silica.

(6)

The method according to any one of items (1) to (5) for producing a magnetic powder, wherein the core-shell particles have an average particle size $R_{core/shell}$ satisfying the relation 4.9 nm$\leq R_{core/shell} \leq$15 nm, and the shell portion has an average thickness $\delta_{soft}$ satisfying the relation 0.4 nm$\leq \delta_{soft} \leq$11 nm.

(7)

The method according to any one of items (1) to (6) for producing a magnetic powder, the method further including subjecting the core-shell particles to a gradual oxidation treatment after the reduction treatment.

(8)

The method according to item (7) for producing a magnetic powder, wherein the shell portion after the gradual oxidation treatment includes a soft magnetic layer and an oxide film, and the oxide film and the soft magnetic layer have an average thickness $\delta_{barrier}$ and an average thickness $\delta_{soft}$, respectively, satisfying the relations 0.4 nm$\leq \delta_{barrier} \leq$11 nm and 0.1$\leq \delta_{soft}/\delta_{barrier} \leq$10, wherein $\delta_{soft}/\delta_{barrier}$ is the ratio of the average thickness $\delta_{soft}$ of the soft magnetic layer to the average thickness $\delta_{barrier}$ of the oxide film.

(9)

The method according to any one of items (1) to (8) for producing a magnetic powder, wherein the core-shell particles have a percentage ratio D of $D_{half}$ to $D_{ave}$ of 40% or less, wherein D=($D_{half}/D_{ave}$)×100, $D_{ave}$ is the average particle size of the core-shell particles, and $D_{half}$ is the half width of the particle size distribution of the core-shell particles.

(10)

The method according to items (1) to (9) for producing a magnetic powder, wherein the core-shell particles have a coercivity Hc satisfying the relation 2,000 Oe$\leq$Hc$\leq$6,000 Oe.

(11)

The method according to any one of items (1) to (10) for producing a magnetic powder, wherein the core-shell particles have a saturation magnetization $\sigma$s satisfying the relation 10 emu/g$\leq \sigma$s$\leq$100 emu/g.

(12)

A magnetic powder including a product obtained by the method according to any one of items (1) to (11).

(13)

A magnetic recording medium including:

a nonmagnetic support; and a magnetic layer including a magnetic powder, wherein the magnetic powder is according to item (12).

(14)

A magnetic powder including core-shell particles each including a core portion including a hard magnetic material and a shell portion including a soft magnetic material, wherein the core-shell particles are obtainable by reducing particles including a hard magnetic material.

(15)

A magnetic recording medium including:

a nonmagnetic support; and a magnetic layer including a magnetic powder, wherein the magnetic powder includes core-shell particles each including a core portion including a hard magnetic material and a shell portion including a soft magnetic material, and the core-shell particles are obtainable by reducing particles including a hard magnetic material.

REFERENCE SIGNS LIST

11 Core portion
12, 13 Shell portion
13a Soft magnetic layer
13b Oxide film
21 Nonmagnetic support 22 Nonmagnetic layer
23 Magnetic layer
24 Back coat layer

The invention claimed is:

1. A method for producing a magnetic powder, the method comprising:

subjecting a plurality of hard magnetic particles to a reduction treatment to form a plurality of core-shell particles,
wherein each core-shell particle of the plurality of core-shell particles has a shell portion comprising a soft magnetic material; and subjecting the plurality of core-shell particles to a gradual oxidation treatment after the reduction treatment, wherein
the shell portion after the gradual oxidation treatment comprises a soft magnetic layer and an oxide film,
the oxide film has an average thickness $\delta_{barrier}$ and the soft magnetic layer has an average thickness $\delta_{soft}$,
the oxide film and the soft magnetic layer satisfies relations 0.4 nm≤$\delta_{barrier}$≤11 nm and 0.1≤$\delta_{soft}/\delta_{barrier}$≤10, and
$\delta_{soft}/\delta_{barrier}$ is a ratio of the average thickness $\delta_{soft}$ of the soft magnetic layer to the average thickness $\delta_{barrier}$ of the oxide film.

2. The method according to claim 1, wherein
the plurality of hard magnetic particles comprises an $\epsilon$-$Fe_2O_3$ crystal, and
the $\epsilon$-$Fe_2O_3$ crystal includes a crystal derived from $\epsilon$-$Fe_2O_3$ by partially substituting Fe sites with a metal element M.

3. The method according to claim 2, wherein the soft magnetic material is $\alpha$-Fe.

4. The method according to claim 1, further comprising:
forming a coating layer on the plurality of hard magnetic particles before the reduction treatment; and
removing the coating layer from the plurality of core-shell particles after the reduction treatment.

5. The method according to claim 4, wherein the coating layer comprises silica.

6. The method according to claim 1, wherein
the plurality of core-shell particles have an average particle size $R_{core/shell}$ satisfying a first relation 4.9 nm≤$R_{core/shell}$≤15 nm, and
the shell portion satisfies a second relation 0.4 nm≤$\delta_{soft}$≤11 nm.

7. The method according to claim 1, wherein
the plurality of core-shell particles have a percentage ratio D of $D_{half}$ to $D_{ave}$ of at most 40%, $D=(D_{half}/D_{ave})\times100$, $D_{ave}$ is an average particle size of the plurality of core-shell particles, and
$D_{half}$ is a half width of a particle size distribution of the plurality of core-shell particles.

8. The method according to claim 1, wherein the plurality of core-shell particles has a coercivity Hc satisfying a relation 2,000 Oe≤Hc≤6,000 Oe.

9. The method according to claim 1, wherein the plurality of core-shell particles has a saturation magnetization $\sigma s$ satisfying a relation 10 emu/g≤$\sigma s$≤100 emu/g.

* * * * *